United States Patent
Claussen et al.

(10) Patent No.: US 6,573,210 B1
(45) Date of Patent: *Jun. 3, 2003

(54) METAL-CERAMIC FORMED BODY AND PROCESS FOR PRODUCING IT

(75) Inventors: Nils Claussen, Auf den Schwarzen Bergen 15, D-21224 Rosengarten (DE); Silvia Schicker, Hamburg (DE); Daniel Garcia, Hamburg (DE); Rolf Janssen, Hamburg (DE)

(73) Assignee: Nils Claussen, Rosengarten (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/180,642

(22) PCT Filed: May 13, 1997

(86) PCT No.: PCT/EP97/02445

§ 371 (c)(1),
(2), (4) Date: Nov. 11, 1998

(87) PCT Pub. No.: WO97/43228

PCT Pub. Date: Nov. 20, 1997

(30) Foreign Application Priority Data

May 14, 1996 (DE) .......................................... 196 19 500

(51) Int. Cl.[7] .................. C04B 35/117; C04B 35/65
(52) U.S. Cl. ................. 501/127; 501/95.2; 501/95.3; 501/153; 260/642; 260/664; 260/674; 419/13; 419/14; 419/19; 428/539.5
(58) Field of Search ................. 501/127, 128, 501/153, 95.2, 95.3; 428/539.5, 307.7; 75/235; 419/13, 14, 19; 260/998.13; 264/642, 664, 674

(56) References Cited

U.S. PATENT DOCUMENTS

| | | | | |
|---|---|---|---|---|
| 2,872,726 A | * | 2/1959 | Goliber | |
| 3,184,306 A | * | 5/1965 | Fish | 501/127 |
| 3,214,250 A | * | 10/1965 | Peras | |
| 4,315,777 A | * | 2/1982 | Nadkarni et al. | |
| 4,673,435 A | * | 6/1987 | Yamaguchi et al. | |
| 5,122,488 A | * | 6/1992 | Newkirk et al. | 501/127 |
| 5,214,011 A | * | 5/1993 | Breslin | |
| 5,482,673 A | * | 1/1996 | Alexander et al. | |
| 5,735,332 A | * | 4/1998 | Ritland et al. | |
| 6,025,065 A | * | 2/2000 | Claussen et al. | 428/307.7 |

FOREIGN PATENT DOCUMENTS

| | | | |
|---|---|---|---|
| DE | 1056037 | | 4/1959 |
| DE | 4447130 | | 7/1996 |
| JP | 61-176354 | * | 8/1986 |
| WO | 9620902 | | 7/1996 |

* cited by examiner

Primary Examiner—David Sample
(74) Attorney, Agent, or Firm—Fulbright & Jaworski LLP

(57) ABSTRACT

A composite ceramic-metal material has an $Al_2O_3$ matrix interpenetrated by a network of a ductile metal phase with a higher meltin temperature than aluminum and which makes up 15 to 80 vol. % of its total volume. The $Al_2O_3$ matrix forms a coherent network that makes up 20 to 85 vol. %, and the material contains 0.1 to 20 atom % aluminide. To produce this composite material, a green body shaped by powder metallurgy and which contains a finely divided powdery mixture of $Al_2O_3$ and optionally other ceramic substances, as well as one or several metals or metal alloys different from aluminum and to which 0.1 to 20 atom % aluminum are added, in relation to the metal proportion, is sintered. The composition is selected in such a way that maximum 15 vol. % aluminide phase can be formed in the finished sintered body.

5 Claims, 3 Drawing Sheets microstructure of a composite having the green body composition of 69 vol% $Al_2O_3$, 23.5 vol% Fe and 7.5 vol% Al vacuum-sintered at 1450°C microstructure of a composite having the green body composition of
69 vol% $Al_2O_3$, 23.5 vol% Fe and 7.5 vol% Al vacuum-sintered at 1450°C microstructure of a composite having the green body composition 3 vol Al, 30 vol% Nb and 67 vol% $Al_2O_3$ vacuum-sintered at 1450°C

METAL-CERAMIC FORMED BODY AND PROCESS FOR PRODUCING IT

The invention relates to a ceramic metal composite with a matrix of $Al_2O_3$, its production and use.

Ceramic materials represent a promising class of materials due to their excellent high temperature stability, their wear resistance and hardness as well as due to their excellent oxidation and corrosion properties. An essential disadvantage, however, is their brittleness which especially limits their application as engineering material. For many years, intensive research activities have therefore been undertaken to improve the fracture toughness of ceramic materials.

One such trial to solve this problem represents, for instance, the inclusion of transformable $ZrO_2$ particles ("Strengthening Strategies for $ZrO_2$-Toughened Ceramics at High Temperatures", J.Mater.Sci.Eng., 71 (1985) 23) or SiC-Whiskers ("TZP Reinforced with SiC Whiskers", J.Am.Ceram.Soc., 69, (1986) 288) into an $Al_2O_3$ matrix.

In the sixties, the development of cermets, two-phase composites consisting of a ceramic matrix with a ductile metal inclusion phase ("Aufbau und Eigenschaften von Cermets", [Microstructure and Properties of Cermets], was considered especially promising for the increase of damage tolerance of ceramic materials. The hope of combining the positive properties of both material classes into cermets remained, however, unfulfilled in almost all cases. In most cases, pressureless sintering is not possible due to the bad wetting behavior of liquid metals to oxide ceramics, because the liquid metal phase sweats out of the green body during the temperature treatment. Even an improvement of the wetting behavior by alloying elements or coatings ("Fabrication of Cermets from Alumina and Ni-Based Alloys", Ceram. Trans., Ceramic Science III, (Ed. G. L. Messing), Vol. 12, (1990) 911 and "Effect of Ti on Sinterability of 70% $Al_2O_3$-30% Cr Cermets", Ceram.Bull. 57 (1978) 1056) was unsuccessful. It must therefore be assumed that, accept for the wetting, also the presence of oxide layers on the added metal particles considerably influences the sintering properties of cermets ("Effect of Sintering Atmosphere on the Properties of Cermets", Powder Metallurgy International, 23, [4] (1991) 224). Therefore, expensive production technologies are required, e.g. hot pressing or hot forging (UK-Patent 2,070,068A; U.S. Pat. No. 5,077,246) or post treatment by hot isostatic pressing. The characteristic microstructure of cermets, however, where the ceramic phase is mainly embedded in the metallic phase which often makes up less than 20 vol % of the total volume ("Processing of $Al_2O_3$/Ni-Composites", J.Eur.Ceram.Soc., 10 (1992) 95) usually leads to bad mechanical properties. For this reason, only metal bonded non-oxide cermets, especially carbides, e.g. TiC—Ni ("The Sory of Cermets", Powder Metallurgy International, 21 (1989) 37) were successful in technical application.

In the development of novel metal ceramic composites, it is therefore desired to produce a microstructure consisting of a ceramic matrix in which an interpenetrating metal phase is embedded. These composites enable a marked improvement of mechanical properties ("Effect of Microstructure on Thermal Shock Resistance of Metal-Reinforced Ceramics", J.Am.Ceram.Soc. 77 (1994) 701 and "Metalle verbessern mechanische Eigenschaften von Keramiken", Sprektrum der Wissenschaft, Januar (1993) 107), because the metal embedded in the ceramic matrix exhibits much better mechanical properties than in its "free" state ("Metcers-A Strong Variant of Cermets", Cfi/Ber. DKG 71 (1994) 301).

Methods to produce such metal ceramic composites are, for example, the directed oxidation of molten metals (DMO) ("Formation of Lanxide TM Ceramic Composite Materials", J.Mater. Res., 1 (1986) 81 and "Directed Oxidation of Molten Metals" in: Encyclopedia of Mat. and Eng. (Ed. R. W. Cahn), Supplementary Vol. 2, Pergamon, Oxford (1990) 1111), pressure casting ("Application of the Infiltration Technique to the Manufacture of Cermets", Ber.Dt.Keram.Ges., 48 (1971) 262), infiltration of porous ceramic preforms with liquid metal ("Method for Processing Metal-Reinforced Ceramic Composites" J.Am.Ceram.Soc., 73 [2] (1990) 388), which, if need be, can also take place under pressure in order to also infiltrate non-wetting metals ("Microstructure and Properties of Metal Infiltrated RBSN Composites" J.Eur.Ceram.Soc. 9 (1991) 61) as well as reactive metal infiltration of $SiO_2$-containing preforms ("Al2O3/Al Co-Continuous Ceramic Composite ($C^4$) Materials Produced by Solid/Liquid Displacement Reactions: Processing Kinetics and Microstructures", Ceram.Eng.Sci-.Porc. 15 (1994) 104).

All these methods exhibit, except for the high processing effort, characteristic disadvantages. For example, the two reaction forming methods, the directed oxidation of molten metals and $C^4$ are only suitable for the production of composites that consist of an $Al_2O_3$ matrix and an Si or Mg containing Al alloy. Furthermore, in both cases, the reaction rates are very slow (2 cm/day) and therefore the processing times are extremely long. For technical reasons (no suitable pressure vessel material), only $Al_2O_3$/Al composites can be produced. Similar problems are also associated with infiltration because the processing temperatures required for the infiltration of refractory metals (100–200° C. above the melting points of the metal) cannot be realized for technical reasons.

Even powder metallurgical manufacturing of metal ceramic composites has, in many cases, been shown to be problematic and expensive. For example, $Al_2O_3$-containing metal ceramic composites can be prepared by thermite reactions (SHS: Self-Propagating High-Temperature Synthesis) according to the following reaction scheme.

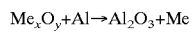

$x,y=1,2, \ldots, n$

In this reaction, a metal oxide is reduced by Al to form the respective metal, while Al oxidizes to $Al_2O_3$ ("Combustion Synthesis of Ceramic and Metal-Matrix Composites", J.Mat.Synth.Proc. 1 (1994) 71). In most cases, this reaction proceeds very exothermally, it is therefore very difficult to control. For this reason, SHS composites are usually porous and inhomogeneous. The bad mechanical properties exclude their use as engineering components.

A further approach to solving the problem of powder metallurgical manufacturing of metal reinforced ceramics is presented in the German application DE-P 44 47 130.0. According to this invention, composites consisting of $Al_2O_3$ and intermetallic aluminide compounds are prepared from metal oxides and aluminum according to the reaction

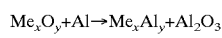

$x,y=1,2, \ldots, n$

It is, however, a certain disadvantage, similar to SHS materials, that the reaction is strongly exothermic and therefore requires an expensive and time-consuming process control. Aluminide usually exhibit good high temperature stability and good corrosion and oxidation resistance, however, a disadvantage is their extreme brittleness at room temperature ("Intermetallics", G. Sauthoff, VCH Verlag, Weinheim, 1995, ISBN 3-527-29320-5)). These aluminide-reinforced ceramics can therefore not be expected to show a considerable increase in fracture toughness by the incorporation of the intermetallic phase.

The object of the present invention is thus to provide composites that comprise an $Al_2O_3$ matrix that is permeated by an interpenetrating network of a ductile metal phase which melts at temperature higher than Al and, that does not exhibit the previously discussed disadvantages.

According to the invention, this task is achieved by a ceramic metal composite with an $Al_2O_3$ matrix and embedded metal wherein the $Al_2O_3$ matrix of the sintered composite is permeated by an interpenetrating network of a ductile metal phase melting at higher temperatures than aluminum that accounts for 15 to 80 vol % of the total volume, the $Al_2O_3$ matrix forming an interconnecting network with a volume content of 20 to 85 vol % and wherein the material contains 0.1 to 20 atom-% aluminum with respect to the metal phase, however, not containing more than 15 vol % aluminide.

According to the invention, a method for producing this metal ceramic composite is characterized by the fact that a powder metallurgically formed green body is sintered which consists of a finely dispersed powder mixture of $Al_2O_3$ and possibly further ceramic substances as well as one or more metals or metal alloys to which aluminum is added in amounts of 0.1 to 20 atom-%, whereby the composition is selected such that the final sintered body contains at the most 15 vol % of aluminide phase. This new class materials, according to the invention, is termed "3A-MC" ($Al_2O_3$, Al-Alloyed Metal Composites).

Aluminum can either be added as powder to the mixture or alloyed to the metal. According to the invention, the $Al_2O_3$ rich phase in the sintered material forms an interconnected network with a volume content between 20 and 85 vol %. The metallic phase, however, comprises 15 to 80 vol % of the total volume and contains, to the largest extent, free Al or Al in solid solution. Preferentially, the metallic phase contains no aluminides. However, up to 15 vol % of aluminides can be accepted with respect to the total body.

The invention is based on the surprising finding that a green body consisting of finely dispersed $Al_2O_3$, Fe and a small amount of Al, which is below the solubility limit of Al in Fe, can be sintered nearly to full density at temperatures of around 1450° C. in vacuum without forming aluminides that can be detected by x-rays.

Prerequisite for the development of the microstructure characterizing the composite of the invention is the existence of finely dispersed constituents of the green body. Such finely dispersed powder is obtained by milling of the constituents on a ball mill or a similar milling device. Milling balls preferentially made of steel, WC-Co, $Al_2O_3$ or $ZrO_2$ (Y-TZP) are used. The specific surface of the milled powder is at least 1 m$^2$/g. Milling in an organic fluid such as cyclohexane, aceton etc. is preferred. However, also dry milling under argon is possible, as usually is the case during mechanical alloying.

The composition of the green body is selected such that the metal phase in the sintered composite body comprises 15 to 80 vol % of the total volume. Aluminum added to the mixture is present either in free state or in solid solution in the metal phase or it reacts with the oxide layer on the surface of the metal particle according to the reaction:

$$Me_xO_y+Al\rightarrow Me+Al_2O_3$$

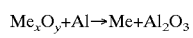

x,y=1,2, . . . , n

Preferentially $ZrO_2$, mullite, $B_4C$, SiC, $TiB_2$ are selected as additional ceramic substances for the powder mixture.

The metal phase consists preferentially of iron or an iron alloy. It can, however, also consists of one or more of the following metals or its alloys or compounds: Cr, Co, Hf, Mo, Nb, Ni, Pt, Si, Ti, Ta, Y, W, V, Zr.

It is also possible to add reinforcing or functional elements to the powder mixture. These should be present for instance in form of particles, spheres, platelets, whiskers, short or long fibers or a woven arrangement of these fibers etc. The reinforcement or functional elements consisting essentially of $Al_2O_3$, mullite, $Si_3N_4$ or SiC (B, N), should exhibit diameters between 5 and 100 μm in order to maintain the good mechanical properties of the matrix body. Sintering of the green body is performed pressureless at temperatures between 1200 and 1700° C. in vacuum or in inert or reducing atmosphere. The sintered body can, if desired, be post compacted by hot isostatic pressing or by superplastically forming to net-shape at temperatures between 1200 and 1600° C. and at pressures between 50 and 300 MPa.

The enclosed picture explains the microstructure of the composite according to the invention:

FIG. 1 shows the microstructure of the composite which was prepared from a green body consisting of 69 vol % $Al_2O_3$, 23.5 vol % Fe and 7.5 vol % Al. The light regions represent the metal phase consisting of Fe, the dark regions the ceramic matrix phase consisting of $\alpha$-$Al_2O_3$. The metal phase comprises about 30 vol %, the ceramic matrix about 70 vol % of the total volume. The total powder mass was 100 g, which was attrition milled for 7 hours using $ZrO_2$ balls in aceton.

FIG. 2 shows a diagram of the shrinkage course of a powder mixture of 69 vol % $Al_2O_3$, 23.5 vol % Fe and 7.5 vol % Al recorded in a dilatometer.

FIG. 3 shows the microstructure of a composite pressureless sintered at 1550° C. having a starting composition of 3 vol % Al, 30 vol % Nb and 67 vol % $Al_2O_3$. When compared to the present state of the art, a number of considerable advantages are achieved by the present invention. For instance, problems associated with processing and technological safety, which usually occur during powder metallurgical processing of powder mixtures with high Al contents such as inert gas milling, oxygen take-up, spontaneous oxidation of finely milled aluminum, are avoided. These problems can be neglected because of the low aluminum content of the powder mixtures associated with "3A-MC's".

Complete densification is possible by pressureless sintering at temperatures of about 1400° C. by hot isostatic pressing even at temperatures of about 1300° C. According to the invention, the present composite can therefore be produced at low technological effort and low costs. Additional sintering aids are not required.

According to the invention, the present composite represents an ideal matrix for reinforcing materials, especially for platelet and fiber composites. Because of the low required sintering temperatures, fiber composites can be densified easily without damaging the fibers.

According to the invention, the composite combines the typical positive ceramic properties such as high temperature stability, corrosion and oxidation stability as well as high hardness, with a fracture strength and fracture toughness which is enhanced by the metallic inclusion phase. Due to the interconnected metal phase, the composite exhibits good thermal conductivity which again results in an improved thermal shock resistance.

The composite is also electrically conducting because of the continuous metal phase such that machining by electrodischarge erosion and inductive heating is possible. The variety of metal phases is considerably extended when compared to the alumina-aluminide composites since the metal phase is not limited to aluminides which are brittle at room temperature. Because of this fact, the functional properties can be precisely controlled by variation of the starting composition, e.g. the electrical resistivity.

The composites according to the invention cannot be obtained with comparable features when applying conventional techniques. For instance, infiltration of a porous ceramic matrix body at temperatures above the melting point of refractory metals can only be, if at all, carried out with an unjustifiable technical effort. Powder metallurgical manufacturing without the addition of the aluminum leads to highly porous products with insufficient mechanical properties. According to the invention, however, practically all alloying additives known from metallurgical processing as well as the respective heat treatment can be utilized to precisely control the mechanical properties of the metal phase. This is especially true for steel as included metal phase.

The almost unlimited variability in choosing the metal phase to produce "3A-MC's" according to the invention as well as their easy manufacturing with simple technological means demonstrates that the present invention opens a new class of composites. Fields of application for "3A-MC's" are for example wear resistent components for machinery and apparatus as well as frictional elements, especially brake elements, and as bio-inert implants.

The following examples explain the invention in more detail.

It has to be pointed out that, in all examples, 10 to 40 weight % of Al are transformed into an amorphous $Al_2O_3$ and gamma like $Al_2O_3$ phases by oxidation during attrition milling. These milling effects are explained in more detail in "Effect of Processing Parameters on Phase and Microstructure Evolution in RBAO Ceramics" J.Am.Ceram.Soc. 77 (1994) 2509.

EXAMPLE 1

Figure 1:
FIG. 1 shows the microstructure of a composite which was prepared from a green body containing 69 vol % $Al_2O_3$, 23.5 vol % Fe and 7.5 vol. % Al.

100 g of a powder consisting of 6 vol % Al powder (Alcan 105, 20 to 50 μm diameter, Alcan, Montreal/Canada), 51 vol % $Al_2O_3$ (MPA 4, Ceralox Condea Chemie, Brunsbüttel, 0.3 μm diameter), 43 vol % Fe (BASF, Ludwigshafen, <10 μm diameter) were attrition milled for 7 hours in aceton using 3 mm TZP-milling balls. The average powder particle size was thereby reduced to round 1 μm. After drying the mixture, plates with the dimensions 40×40×8 mm³ were isostatically pressed at a pressure of 300 to 900 MPa. The samples where then heated in vacuum at 30 K/min to 1500° C. and kept at this temperature for 1 hour.

After this treatment, all samples exhibited a density of above 95% TD (theoretical density), fine pores with diameters with <1 μm were still present. The bodies consisted of iron with small (diameter <5 μm ) areas, that were incorporated essentially interconnectively in a ceramic matrix of about 50 vol % $Al_2O_3$. Fe aluminides could not be detected by x-rays. The shrinkage (linear difference between the dimensions of the green and the sintered body) was 12% at an isostatic pressure of 900 MPa, and 16% at 300 MPa. The mean 4-point-bend strength of rectangular samples machined from the plates with dimensions 30×4×4 mm³ was 690 MPa and the fracture toughness according to indentation crack length (ICL) technique was 7.5 MPa $m^{1/2}$.

EXAMPLE 2

As described in example 1, the mixture consisting of 4 vol % Al, 29 vol % Fe (Aldrich, Steinheim, <10 μm diameter), 67 vol % $Al_2O_3$ was attrition milled for 7 hours, dried and isostatically pressed at 900 MPa. The samples were than heated in vacuum at 30 K/min to 1525° C. and kept at this temperature for 1 hour. The shrinkage was 15% at a final density of above 69% TD. The sintered body consisted of about 30 vol % Fe and 70 vol % $Al_2O_3$ with traces of finely dispersed $Fe_3Al$.

EXAMPLE 3

As described in example 1, a mixture of 3 vol % Al, 30 vol % Nb (Starck, Goslar, <10 μm diameter), 67 vol % $Al_2O_3$ was attrition milled in isopropanol instead of aceton, dried and isostatically pressed at 300 MPa. The samples were than heated in vacuum at 15 K/min to 1550° C. and kept at this temperature for 1 hour. Thereafter, the shrinkage was 16.5% at a final density of above 96% TD. The sintered body consisted of about 30 vol % Nb with traces of $AlNb_3$ and about 70 vol % $Al_2O_3$. The ICL fracture toughness was 7.1 MPa √m.

EXAMPLE 4

As described in example 1, a mixture of 5 vol % Al, 60 vol % $Al_2O_3$ and 35 vol % Nb was attrition milled, dried and isostatically pressed at 400 MPa. The samples were than heated in forming gas at 25 K/min to 1500° C. and kept at this temperature for 2 hours. The sintered bodies had a density of >95% TD and consisted thereafter of about 35 vol % Nb and 65 vol % $Al_2O_3$ with traces of $Nb_3Al$. After a 10 min post hot isostatic pressing at an Ar pressure of 180 MPa and a temperature of 1450° C., all samples were nearly fully dense; the ICL fracture toughness was 8.2 MPa √m.

EXAMPLE 5

As described in example 1, a mixture of 3 vol % Al, 30 vol % Ti, (Aldrich, Steinheim <100 μm diameter), 67 vol % $Al_2O_3$ was attrition milled, dried and isostatically pressed at 300 MPa. After sintering in forming gas at 1550° C. for 2 hours, the resulting bodies had a density of about 95% TD at a shrinkage of 14.2%. The sintered body consisted of Ti and $Al_2O_3$. Traces of $Ti_3Al$ could also be detected.

EXAMPLE 6

200 g of a mixture of 4 vol % Al, 48 vol % $Al_2O_3$ and 48% Ti was attrition mulled in cyclohexane with 1.7 weight % stearic acid for 3 hours and spray dried. After isostatic pressing at 300 Mpa and sintering in vacuum at 1500° C. for 1 hour, bodies having a density of about 95% TD at a shrinkage of 15.5% were obtained. The sintered body consisted of about 50 vol % Ti and 50 vol % $Al_2O_3$.

EXAMPLE 7

As explained in example 1, a mixture of 7 vol % Al, 42 vol % Ni and 51 vol % $Al_2O_3$ was attrition milled, isostatically pressed at 300 Mpa and sintered in vacuum at 1425° C. At a shrinkage of 14.3% and a sintered density of >95% TD, the body consisted of about 50 vol % $Al_2O_3$ matrix with finely distributed interconnected Ni. After a 20 min HLP-post densification at 200 MPa Ar pressure, the ICL fracture toughness was 8.3 MPa √m.

EXAMPLE 8

As described in example 2, a mixture of 33 vol % Al, 15 vol % Mo (Heraeus, Karlsruhe, 2 to 4 μm diameter) and 82 vol % $Al_2O_3$ was attrition milled, isostatically pressed and sintered. The samples achieved a density of about 96% TD at a shrinkage of 14.3%. The sintered bodies consisted of about 15 vol % Mo as well as about 85 vol % $Al_2O_3$. Traces of $Mo_3Al$ and other phases, which could not yet be identified were detected, were detected by x-rays.

EXAMPLE 9

As described in example 2, a mixture of 3 vol % Al, 29 vol % Mo and 68 vol % $Al_2O_3$ was attrition milled, isostatically pressed and sintered at 1600° C. in forming gas for 2 hours. The samples were nearly completely dense and consisted of about 30 vol % Mo with a small fraction Of $Mo_3Al$ as well as about 70 vol % of $Al_2O_3$

EXAMPLE 10

100 g of a powder-mixture consisting of 69 vol % $Al_2O_3$, 23.5 vol % Fe and 7.5 vol % Al were attrition milled for 7 hours with $ZrO_2$ nulling balls in aceton, thereafter, a green body was produced as described in example 1. FIG. 1 shows a microstructure of the obtained composite were the dark areas represent α-$Al_2O_3$ and a light areas the metal phase. The letter comprises about 30 vol % the $Al_2O_3$ matrix about 70 vol %

COMPARATIVE EXAMPLE 11

As described in example 1, a green body was prepared from 71 vol % $Al_2O_3$ and 28.5 vol % Fe without the addition of Al. After sintering at 1450° C., the received composite still exhibited a remaining porosity of 18 vol %.

EXAMPLE 12

Figure 2:
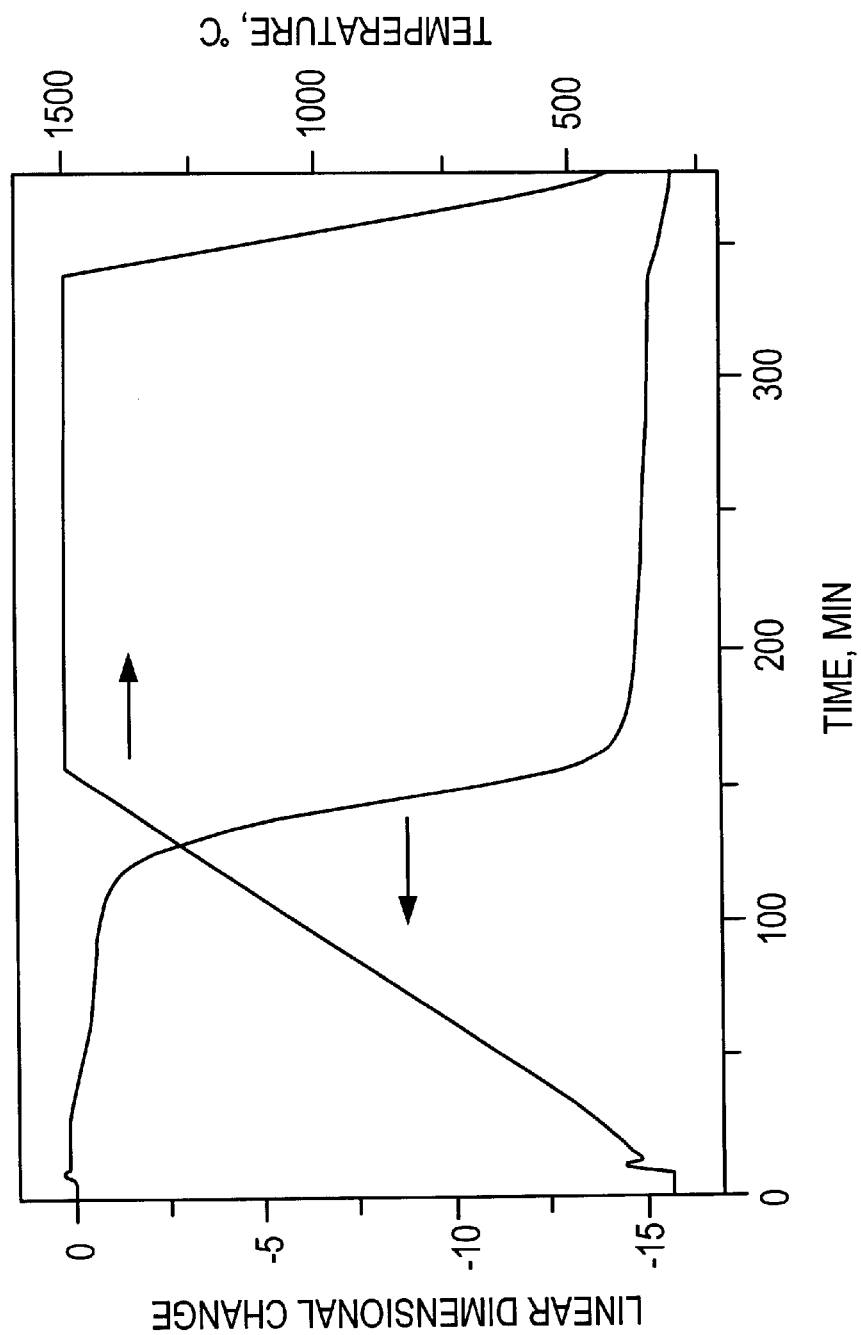
FIG. 2 shows a diagram of the shrinkage versus time for a powdered mixture of 69 vol % $Al_2O_3$, 23.5 vol % Fe and 7.5 vol. % Al.
Figure 3:
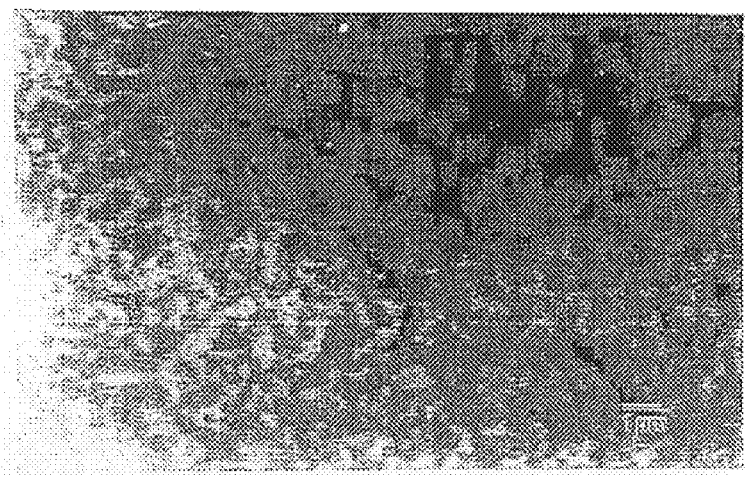
FIG. 3 shows the microstructure of a composite vacuum-sintered at 1550° C. having a starting composition of 3 vol % Al, 30 vol % Nb and 67 vol % $Al_2O_3$.

As described in example 1, a powder mixture was prepared of 69 vol % $Al_2O_3$, 23.5 vol % Fe and 7.5 vol % Al, pressed into a green body and sintered. Sintering starts at a temperature above 1300° C. and is concluded at a temperature of 1550° C. The shrinkage curve of this sample is shown in FIG. 2. In spite of the existence of the metal phase that usually hinders sintering, complete densification took place.

What is claimed is:

1. A process for fabricating a ceramic composite, comprising sintering a powder metallurgically formed green body comprising a finely dispersed powder mixture of $Al_2O_3$ and one or more non-aluminum metals or non-aluminum metal alloys, and adding aluminum in quantities between 0.1 and 20 atom % relative to the metal fraction, whereby the composition is selected such that no more than 15 vol % aluminide phase can be formed in the final sintered body wherein the mixture of the starting powder components, used for the preparation of the green body, is milled in a ball mill for such a period of time that the specific surface reaches at least 1 $m^2/g$.

2. The process of claim 1, wherein said sintering step is conducted at temperatures between 1200 and 1700° C. in vacuum or in inert or reducing atmosphere.

3. The process of claim 1, wherein aluminum is added as powder or alloyed to the metal.

4. A process for fabricating a ceramic composite comprising: sintering a powdered metallurgically formed green body comprising a finely dispersed powder mixture of $Al_2O_3$ and one or more non-aluminum metals or non-aluminum metal alloys, and adding aluminum in quantities between 0.1 and 20 atom % relative to the metal fraction, whereby the composition is selected such that no more than 15 vol % aluminide phase can be formed in the final sintered body, wherein prior to forming the green body, reinforcement or functional element in form of particles, spheres, platelets, whiskers, short fibers, long fibers or fiber weavings are added to the powder mixture, wherein said particles, spheres, platelets, whiskers, fibers and weavings are $Al_2O_3$, mullite, $Si_3N_4$, or SiC (B,N) and have diameters of from 5 to 100 μm.

5. A process for fabricating a ceramic composite comprising: sintering a powdered metallurgically formed green body comprising a finely dispersed powder mixture of $Al_2O_3$ and one or more non-aluminum metals or non-aluminum metal alloys, and adding aluminum in quantities between 0.1 and 20 atom % relative to the metal fraction, whereby the composition is selected such that no more than 15 vol % aluminide phase can be formed in the final sintered body, wherein the sintered formed body is post-densified either hot isostatically or superplastically into net-shape at temperatures between 1200 and 1600° C. and at pressures between 50 and 300 MPa.

* * * * *